US008094990B2

(12) United States Patent (10) Patent No.: US 8,094,990 B2
Ichikawa (45) Date of Patent: Jan. 10, 2012

(54) INFORMATION PROCESSING APPARATUS

(75) Inventor: Tatsuya Ichikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1322 days.

(21) Appl. No.: 11/729,167

(22) Filed: Mar. 28, 2007

(65) Prior Publication Data

US 2007/0285573 A1 Dec. 13, 2007

(30) Foreign Application Priority Data

Mar. 28, 2006 (JP) .................................. 2006-087584

(51) Int. Cl.
*H04N 5/765* (2006.01)
*H04N 5/775* (2006.01)
(52) U.S. Cl. ....................................... 386/200; 386/230
(58) Field of Classification Search .................. 386/200, 386/230, 282, 353, 356, 278
See application file for complete search history.

(56) References Cited

U.S. PATENT DOCUMENTS

2006/0290960 A1* 12/2006 Matsuhira ..................... 358/1.12

FOREIGN PATENT DOCUMENTS

| JP | 09-233409 | 9/1997 |
|---|---|---|
| JP | 2005-045620 A | 2/2005 |
| JP | 2005-088533 | 4/2005 |
| JP | 2005-268912 | 9/2005 |
| JP | 2005-287015 | 10/2005 |
| JP | 2006-060649 A | 3/2006 |
| JP | 2006-066987 | 3/2006 |

* cited by examiner

*Primary Examiner* — Robert Chevalier
(74) *Attorney, Agent, or Firm* — Nutter McClennen & Fish LLP; John J. Penny, Jr.; Michael P. Visconti, III (57) ABSTRACT

An information processing apparatus includes a timing specifying unit that allows a user to specify a timing to execute video printing of a video file at least including first image data based on which a video frame is generated and second image data based on which a video frame is generated by additionally referring to image data of another video frame; a reference frame selecting unit that selects, on the basis of the timing specified by the timing specifying unit, the video frame generated from the first image data as a reference frame; an additional frame selecting unit that selects, on the basis of the reference frame selected by the reference frame selecting unit, one or a plurality of video frames generated from the first image data as additional frames; and an extracted image displaying unit that generates a plurality of extracted images on the basis of the first image data of the reference frame and the first image data of the additional frames and displays a group of the generated extracted images on a screen.

11 Claims, 7 Drawing Sheets

INFORMATION PROCESSING APPARATUS

The entire disclosure of Japanese Patent Application No. 2006-087584, filed Mar. 28, 2006 is expressly incorporated by reference herein.

BACKGROUND

1. Technical Field

The present invention relates to information processing apparatuses, and more particularly to an information processing apparatus that can display a group of extracted images in the case of video printing.

2. Related Art

An increasing number of users enjoy playing back video streams using information processing apparatuses, such as photo viewers, personal computers, or the like. To play back a video stream using such an information processing apparatus, when a scene of the video stream can be printed as a group of image frames, this further enhances the user-friendliness of the information processing apparatus. For example, JP-A-2005-88533 discloses a technique for appropriately extracting, from a plurality of video frames constituting a video stream, images to print and printing the extracted images.

If such video printing is implemented, for example, a user who plays golf and wants to check his/her swing by capturing a video image of the golf swing and playing it back as a video stream feels it convenient to print a group of images extracted from the video stream at predetermined time intervals. Another user who plays baseball and wants to check his/her pitching form by capturing a video image of the pitching form and playing it back as a video stream feels it convenient to print a group of images extracted from the video stream at predetermined time intervals.

Video files containing image data necessary for generating video frames may be compressed using various data compression techniques to reduce the data amount. Therefore, a complicated decoding algorithm may be necessary to extract images to print from such a video file.

Figure 1:
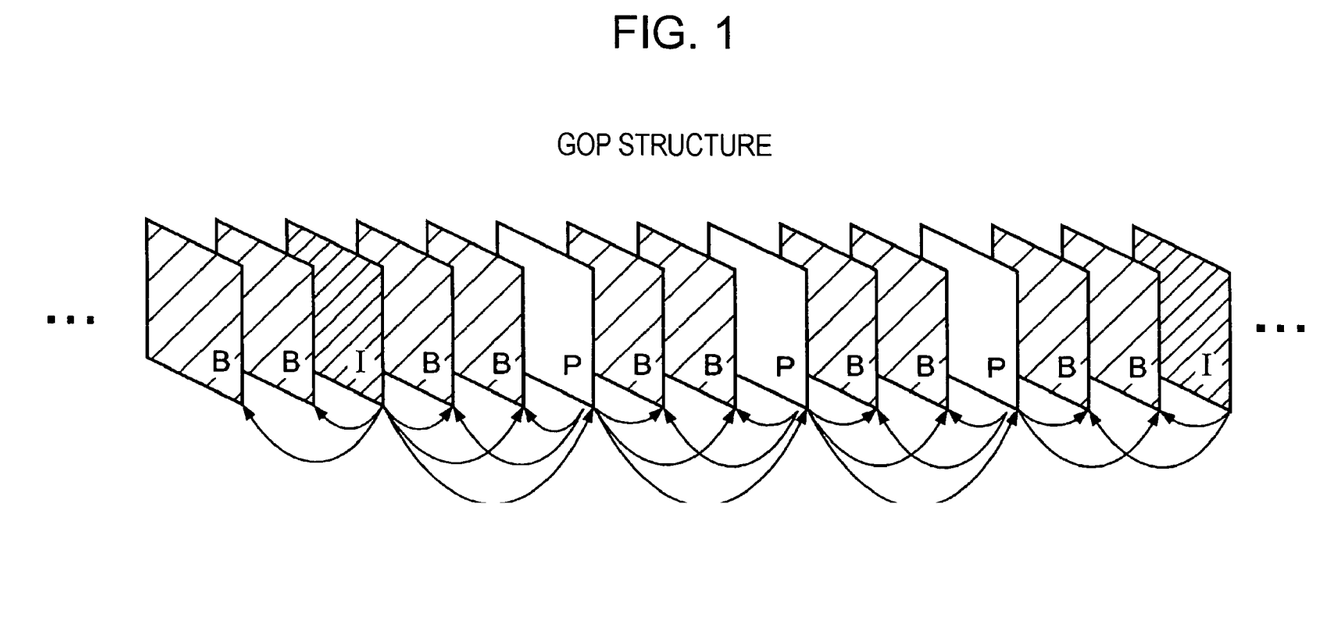
FIG. 1 is a diagram for describing the GOP structure in MPEG-1.

FIG. 1 describes the data format of Moving Picture Experts Group (MPEG)-1, which is a typical compression technique for video data. As shown in FIG. 1, MPEG-1 employs a group of picture (GOP) structure. Image data for generating video frames is classified into three types of pictures, namely, intra-coded (I) pictures, predictive-coded (P) pictures, and bidirectionally predictive-coded (B) pictures. I pictures are image data generated by encoding an input signal, without performing prediction. Since a video frame can be generated from an I picture, I pictures can be used as entry points, such as playback start points. P pictures are image data using single-directional motion compensation prediction. B pictures are image data using bidirectional motion compensation prediction. To generate a video frame from a P or B picture, a video frame(s) that precedes and/or follows the P or B picture must be played back, and then necessary motion compensation must be performed.

In the case that a plurality of extracted images that the user wants to print are composed of P pictures and B pictures, and that the extracted images are to be displayed as a group on a screen such that the user can check the images before printing, it takes a great amount of time to display the group of the extracted images, making the user's waiting time long. It thus takes a long period of time before the images are actually printed.

SUMMARY

An advantage of some aspects of the invention is that it provides an information processing apparatus that can quickly display a group of extracted image, thereby minimizing the total time required before the images are printed as much as possible.

According to an aspect of the invention, there is provided an information processing apparatus including the following elements: a timing specifying unit that allows a user to specify a timing to execute video printing of a video file at least including first image data based on which a video frame is generated and second image data based on which a video frame is generated by additionally referring to image data of another video frame; a reference frame selecting unit that selects, on the basis of the timing specified by the timing specifying unit, the video frame generated from the first image data as a reference frame; an additional frame selecting unit that selects, on the basis of the reference frame selected by the reference frame selecting unit, one or a plurality of video frames generated from the first image data as additional frames; and an extracted image displaying unit that generates a plurality of extracted images on the basis of the first image data of the reference frame and the first image data of the additional frames and displays a group of the generated extracted images on a screen.

It is preferable that the information processing apparatus further include the following elements: a print data generating unit that generates, on the basis of the generated extracted images, print data for printing the group of the extracted images; and a print data sending unit that sends the print data generated by the print data generating unit to a printer.

It is preferable that the information processing apparatus further include a first video playback unit that plays back a video stream by generating successive video frames on the basis of the first image data and the second image data.

In this case, the timing specifying unit can allow the user to specify the timing to execute video printing during the playback of the video stream by the first video playback unit.

It is preferable that, in the case that the user specifies the timing to execute video printing during playback of the video stream by the first video playback unit, the reference frame selecting unit select, as the reference frame, a video frame of the first image data that is closest to a video frame being played back at the timing specified by the user.

In this case, the additional frame selecting unit selects, as the additional frames, video frames of a predetermined number of pieces of the first image data that follow the reference frame, video frames of a predetermined number of pieces of the first image data that precede the reference frame, or video frames of a predetermined number of pieces of the first image data that precede and follow the reference frame.

It is preferable that the information processing apparatus further include a video file specifying unit that allows the user to specify a video file and to give a video printing instruction. It is preferable that, in the case that the video printing instruction is issued by the video file specifying unit, the reference frame selecting unit select the first image data at the beginning of the specified video file as the reference frame.

It is preferable that the information processing apparatus further include the following elements: an extracted image selecting unit that selects one extracted image from among the extracted images displayed by the extracted image displaying unit; a second video playback unit that plays back, starting from the video frame of the extracted image selected by the extracted image selecting unit, video frames of the second image data in a forward or backward direction on a frame-by-frame basis; and a replacement unit that replaces the extracted image selected by the extracted image selecting unit with the video frame being played back by the second video playback unit at the timing specified by the user.

In this case, the video frames played back by the second video playback unit are video frames from the video frame of the second image data immediately following the video frame of the first image data immediately preceding the video frame of the extracted image selected by the extracted image selecting unit to the video frame of the second image data immediately preceding the video frame of the first image data immediately following the video frame of the extracted image selected by the extracted image selecting unit.

According to another aspect of the invention, there is provided a control method for an information processing apparatus, the method including: allowing a user to specify a timing to execute video printing of a video file at least including first image data based on which a video frame is generated and second image data based on which a video frame is generated by additionally referring to image data of another video frame; selecting, on the basis of the specified timing, the video frame generated from the first image data as a reference frame; selecting, on the basis of the selected reference frame, one or a plurality of video frames generated from the first image data as additional frames; and generating a plurality of extracted images on the basis of the first image data of the reference frame and the first image data of the additional frames and displaying a group of the generated extracted images on a screen.

According to another aspect of the invention, there is provided a recording medium having a program recorded thereon, the program allowing an information processing apparatus to execute the following: allowing a user to specify a timing to execute video printing of a video file at least including first image data based on which a video frame is generated and second image data based on which a video frame is generated by additionally referring to image data of another video frame; selecting, on the basis of the specified timing, the video frame generated from the first image data as a reference frame; selecting, on the basis of the selected reference frame, one or a plurality of video frames generated from the first image data as additional frames; and generating a plurality of extracted images on the basis of the first image data of the reference frame and the first image data of the additional frames and displaying a group of the generated extracted images on a screen.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described with reference to the drawings. The embodiment described below is not intended to limit the technical scope of the invention.

Figure 2:
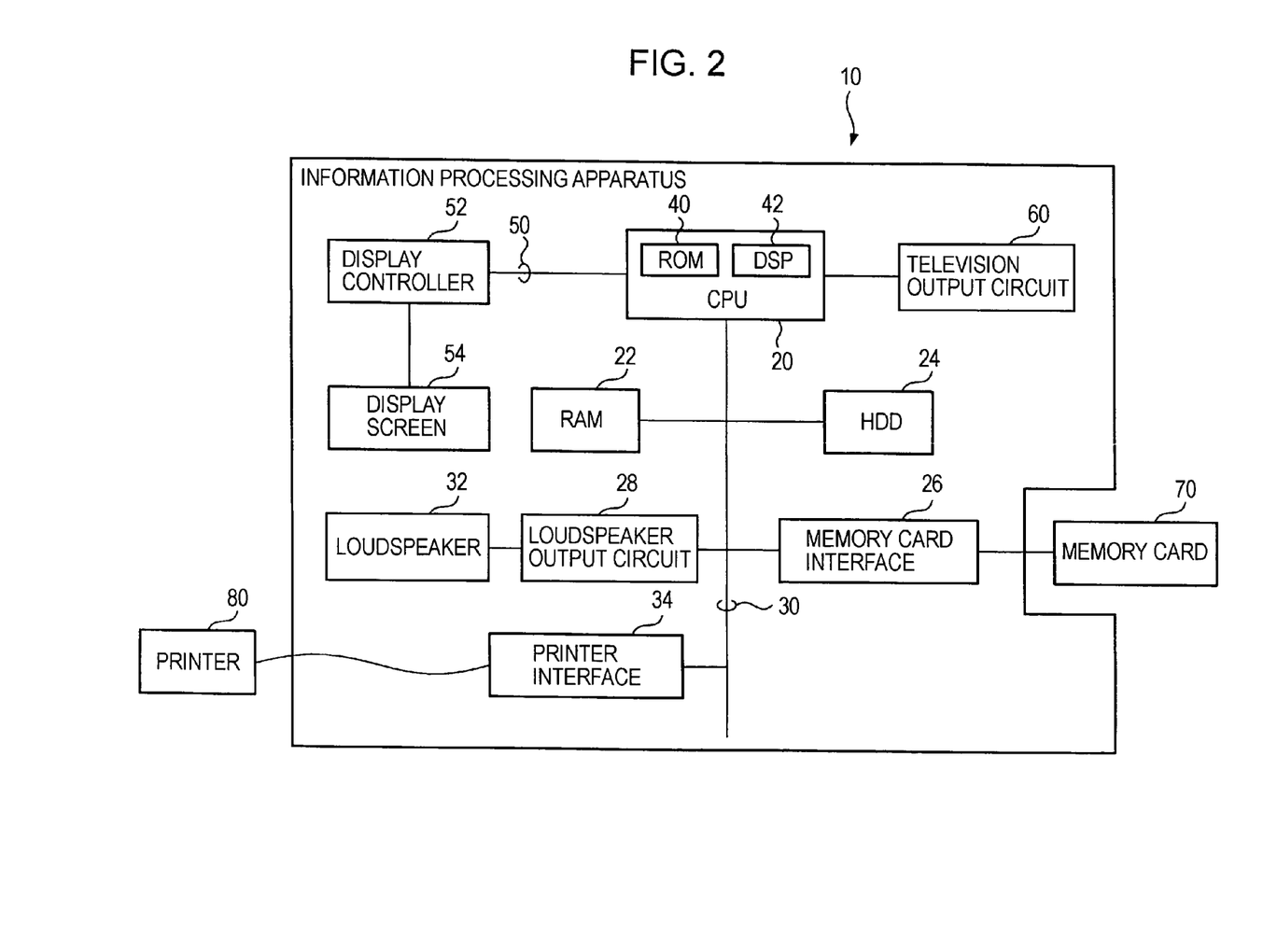
FIG. 2 is a block diagram of an exemplary internal structure of an information processing apparatus according to an embodiment of the invention.

FIG. 2 is a block diagram for describing the internal structure of an information processing apparatus 10 according to the embodiment. As shown in FIG. 2, the information processing apparatus 10 according to the embodiment has a central processing unit (CPU) 20, a random access memory (RAM) 22, a hard disk drive 24, a memory card interface 26, a loudspeaker output circuit 28, and a printer interface 34. These components are connected to one another via an internal bus 30. The loudspeaker output circuit 28 is connected to a loudspeaker 32. According to the embodiment, the loudspeaker 32 outputs sounds in the case that a video stream is played back.

The CPU 20 contains a read only memory (ROM) 40 and a digital signal processor (DSP) 42. The DSP 42 performs processing to compress a data file containing a still image, a moving image (video stream), or music, and to expand a compressed data file. According to the embodiment, the DSP 42 decodes MPEG-1 image files to reproduce P pictures and B pictures.

The CPU 20 is connected to a display controller 52 via a dedicated bus 50. The display controller 52 is further connected to a display screen 54. That is, when the CPU 20 sends image data to be displayed to the display controller 52 via the dedicated bus 50, the display controller 52 controls the display screen 54 on the basis of the image data and displays the image data on the display screen 54. According to the embodiment, the display screen 54 is composed of a liquid crystal display (LCD) and displays, for example, still images, moving images (video streams), and a screen for extracting images from a video stream, which will be described later.

The information processing apparatus 10 according to the embodiment has a television output circuit 60 connected to the CPU 20. By connecting a television image output cable to a connector (not shown) of the information processing apparatus 10, the user can view still images and moving images (video streams) and listen to sounds, which are output from the CPU 20, on a household television.

A memory card 70 is mounted to the information processing apparatus 10 as needed. Various types of files stored on the memory card 70 mounted to the information processing apparatus 10 can be loaded into the information processing apparatus 10 via the memory card interface 26. Specifically, files stored on the memory card 70 are loaded by the CPU 20 via the memory card interface 26 and are stored in the hard disk drive 24. According to the embodiment, the hard disk drive 24 or the memory card 70 can store one or multiple video files, for example.

The information processing apparatus 10 is connected to a printer 80 via the printer interface 34. Print data generated by the information processing apparatus 10 is sent via the printer interface 34 to the printer 80 and printed by the printer 80.

According to the embodiment, it is assumed that the information processing apparatus 10 is a photo viewer, which is a portable storage device. Alternatively, the information processing apparatus 10 may be a desktop personal computer, a notebook personal computer, or a cellular phone. The information processing apparatus 10 need not contain the display screen 54, and the information processing apparatus 10 may be connected to a separate display screen.

Figure 3:
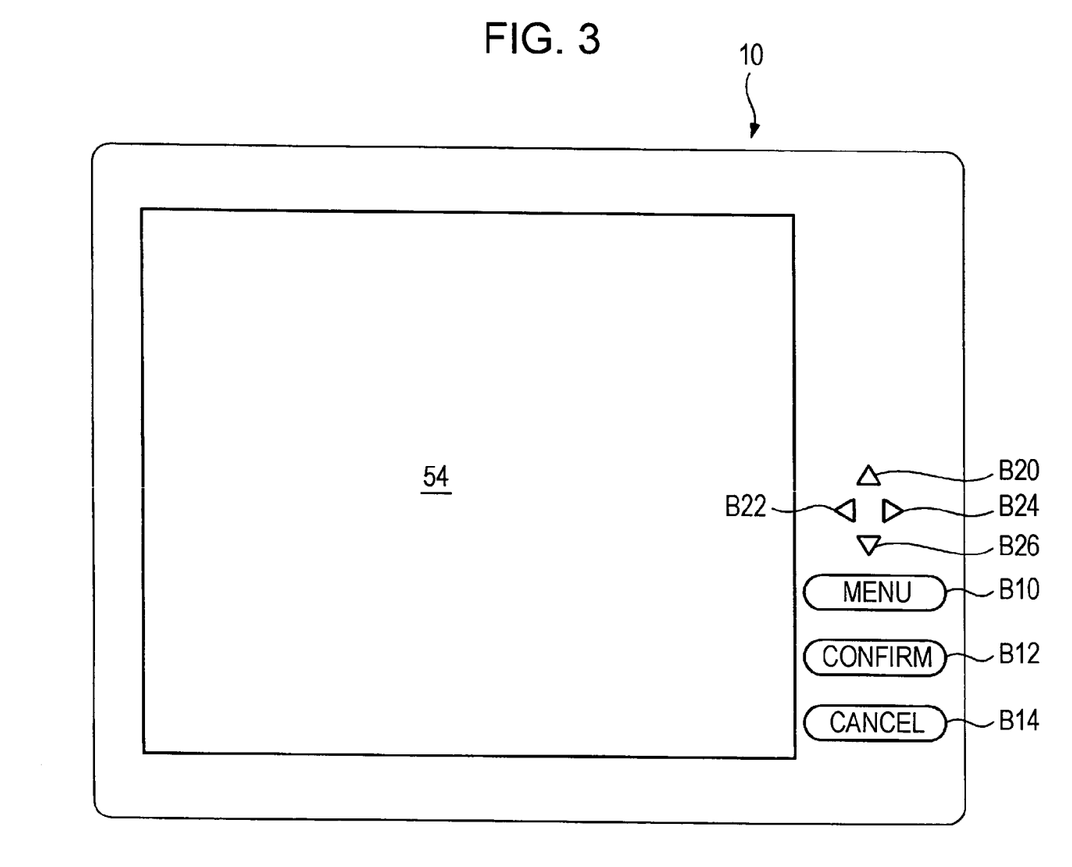
FIG. 3 is a plan view of an exemplary layout of the front of the information processing apparatus shown in FIG. 2.

FIG. 3 is a plan view of the information processing apparatus 10 according to the embodiment, which is viewed from the display screen 54. As shown in FIG. 3, a menu button B10, a confirm button B12, and a cancel button B14, which are operated by the user's finger, are provided at the right side of the display screen 54. Additionally, an upward button B20, a leftward button B22, a rightward button B24, and a downward button B26, which are also operated by the user's finger, are provided above the buttons B10, B12, B14.

The menu button B10 is an operation button to press to display various menu screens on the display screen 54. The confirm button B12 is an operation button to press to finally confirm, after various operations have been performed, the contents of these operations.

The cancel button B14 is an operation button to press to finally cancel, after various settings have been done on the menu screens, the contents of the operations. The upward button B20, the leftward button B22, the rightward button B24, and the downward button B26 are operation buttons to press to move a cursor up, left, right, and down on the menu screens.

Figure 4:
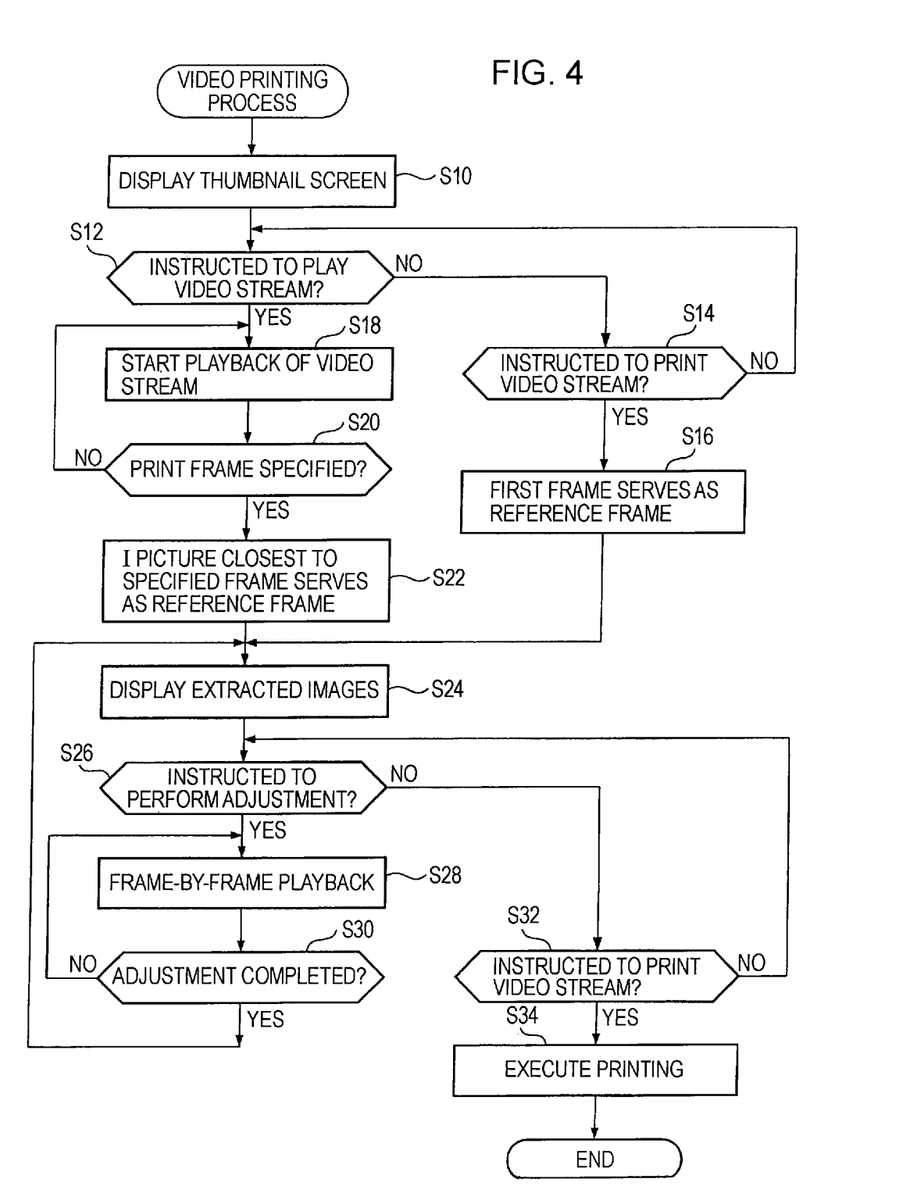
FIG. 4 is a flowchart of a video printing process executed by the information processing apparatus shown in FIG. 2.

FIG. 4 is a flowchart of the contents of a video printing process executed by the information processing apparatus 10 according to the embodiment. This video printing process is implemented by reading and executing, by the CPU 20, a video printing process program stored on the ROM 40 in the CPU 20. The video printing process is activated in response to a video printing instruction issued from the user to the information processing apparatus 10. Such a video printing instruction is issued, for example, by pressing, by the user, the menu button B10 to display a menu screen on which the user selects video printing from among options on the menu screen.

Figure 5:
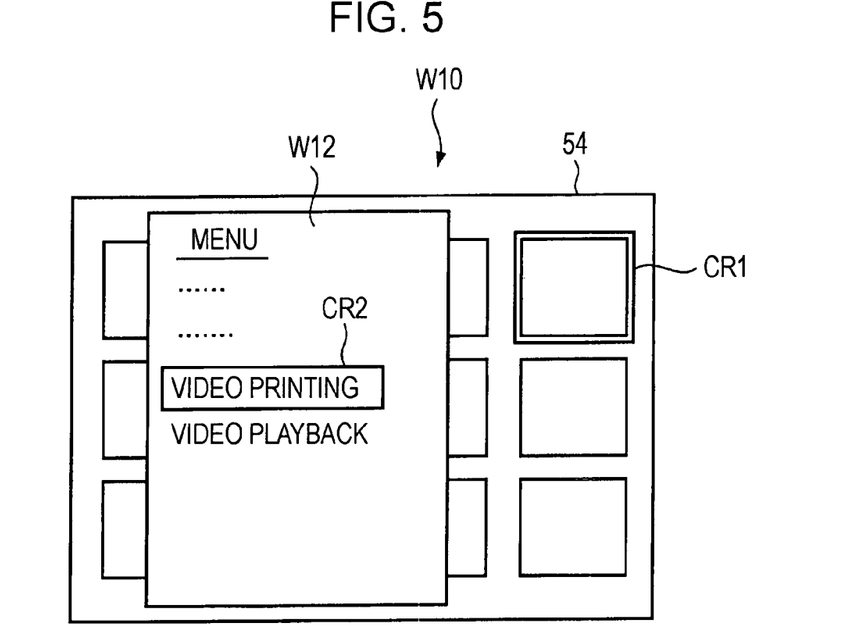
FIG. 5 is a diagram of an exemplary thumbnail screen displayed on a display screen.

As shown in FIG. 4, when the video printing process serving as a file selecting process begins, the information processing apparatus 10 displays a thumbnail screen displaying thumbnail images of video files on the display screen 54 (step S10). FIG. 5 shows an exemplary structure of a thumbnail screen W10 according to the embodiment. As shown in FIG. 5, the thumbnail screen W10 displays a group of video files contained in a folder specified by the user and a menu window W12. According to the embodiment, it is assumed that the video files are generated in, for example, the MPEG-1 format.

The group of video files is displayed as thumbnail images, which are the reduced first images of corresponding video streams. Referring to these thumbnail images, the user presses the leftward button B22 and the rightward button B24 to move a cursor CR1 to a desired video file that the user wants to print. According to the embodiment, it is assumed that pressing the rightward button B24 in a state that the cursor CR1 is positioned on any of the rightmost thumbnail images on the thumbnail screen W10 moves the cursor CR1 to the leftmost thumbnail image on the next line below the current line. Similarly, it is assumed that pressing the leftward button B22 in a state that the cursor CR1 is positioned on any of the leftmost thumbnail images on the thumbnail screen W10 moves the cursor CR1 to the rightmost thumbnail image on the next line above the current line.

The menu window W12 displays command options that can be selected by the user and a cursor CR2. The user presses the upward button B20 and the downward button B26 to move the cursor CR2 to a desired command option that the user wants to execute. According to the embodiment, the user can select one of the command options "video printing" and "video playback".

As shown in FIG. 4, the information processing apparatus 10 determines whether the user has issued a video playback instruction (step S12). Specifically, it is determined whether the user has moved the cursor CR2 to "video playback" on the menu window W12 and pressed the confirm button B12.

When it is determined that the user has issued no video playback instruction ("NO" in step S12), the information processing apparatus 10 then determines whether the user has issued a video printing instruction (step S14). Specifically, it is determined whether the user has moved the cursor CR2 to "video printing" on the menu window W12 and pressed the confirm button B12.

When it is determined that the user has issued no video printing instruction ("NO" in step S14), the information processing apparatus 10 returns to step S12 described above.

In contrast, when it is determined that the user has issued a video printing instruction ("YES" in step S14), the information processing apparatus 10 regards the first frame of a video file specified by the user as a reference frame (step S16). That is, a video file on which the cursor CR1 is positioned is determined as the video file specified by the user, and an I picture at the beginning of the specified video file is regarded as a reference frame. Note that, as has been described with reference to FIG. 1, image data at the very beginning of a video file is an I picture. Thus, a video frame generated from this image data at the beginning serves as a reference frame. The reference frame serves as the basis for generating extracted images, which are obtained by extracting multiple still images from the video stream. According to the embodiment, twelve video frames including the reference frame serve as extracted images and are printed.

In contrast, when it is determined that the user has issued a video playback instruction in step S12 ("YES" in step S12), the information processing apparatus 10 starts playing back the video file specified by the user. That is, the video file on which the cursor CR1 is positioned is determined as the video file specified by the user, and playback of the specified video file begins.

Figure 6:
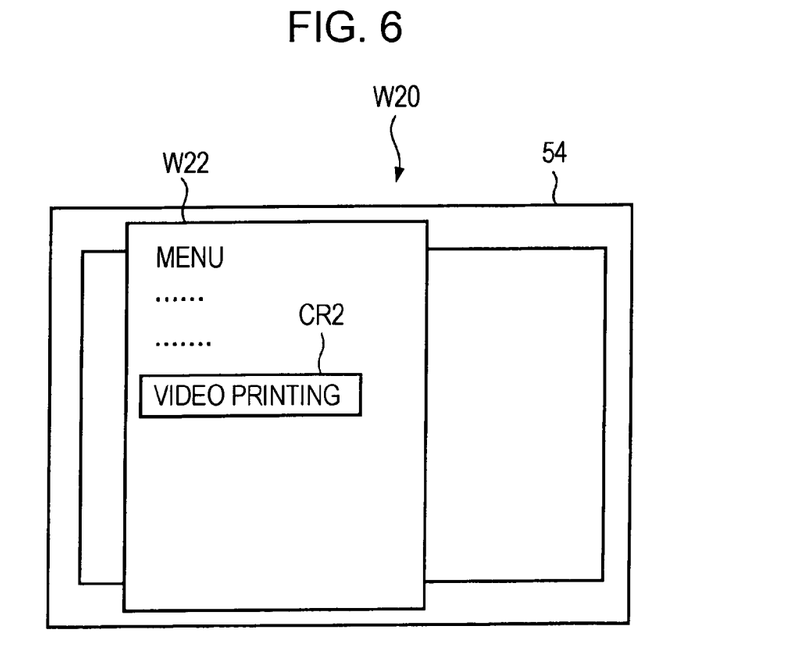
FIG. 6 is a diagram of an exemplary video playback screen displayed on the display screen.

FIG. 6 shows an exemplary video playback screen displayed on the display screen 54. To play back the video file, as has been described above, I pictures, B pictures, and P pictures are sequentially decoded to generate consecutive video frames.

As shown in FIG. 6, according to the embodiment, the video stream is played back and displayed on a large portion of the display screen 54, and a menu window W22 is displayed. The cursor CR2 on the menu window W22 moves up and down by pressing the upward button B20 and the downward button B26, as has been described above.

Next, as shown in FIG. 4, the information processing apparatus 10 determines whether a print frame is specified (step S20). Specifically, in a state where the cursor CR2 is positioned on "video printing" on the menu window W22, the user views the video stream being played back and presses the confirm button B12 at the time the user wants to start video printing.

When it is determined that no print frame is specified ("NO" in step S20), the information processing apparatus 10 repeats step S20 on standby.

In contrast, when it is determined that a print frame is specified ("YES" in step S20), the information processing apparatus 10 specifies the I picture closest to a video frame displayed at the specified timing and selects this I picture as a reference frame (step S22).

Figure 7:
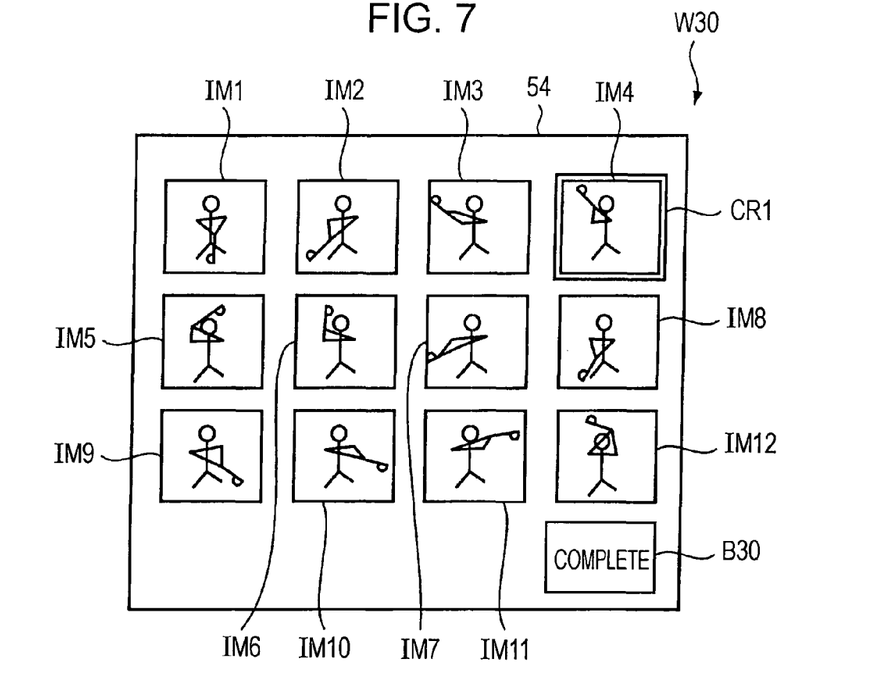
FIG. 7 is a diagram of an exemplary extracted image display screen displayed on the display screen.

After selecting the reference frame in step S16 or step S22, the information processing apparatus 10 generates extracted images and displays the extracted images on the display screen 54 (step S24). FIG. 7 shows an exemplary extracted image display screen W30 displayed on the display screen 54 in this case.

As shown in FIG. 7, the extracted image display screen W30 according to the embodiment displays twelve extracted images IM1 to IM12. The extracted image IM1 in the upper left-hand corner of the extracted image display screen W30 is the reference frame selected in step S16 or step S22. This reference frame is an I picture. Eleven I pictures following (in terms of time) the I picture serving as the reference frame are displayed as the extracted images IM2 to IM12. That is, the reference frame serves as the starting point, and the eleven extracted images IM2 to IM12 are generated on the basis of these eleven I pictures following the reference frame. Because the extracted images are generated on the basis of the I pictures, motion compensation calculations or the like are unnecessary, unlike the case where extracted images are generated using B pictures and P pictures. Accordingly, the extracted image display screen W30 can be displayed very quickly.

Next, as shown in FIG. 4, the information processing apparatus 10 determines whether the user has issued an adjustment instruction (step S26). Specifically, the information processing apparatus 10 determines whether the user has moved the cursor CR1 on the extracted image display screen W30 shown in FIG. 7 to a desired extracted image that the user wants to adjust and pressed the confirm button B12. As have been described above, the cursor CR1 is moved by pressing the leftward button B22 and the rightward button B24 on the extracted image display screen W30.

Figure 8:
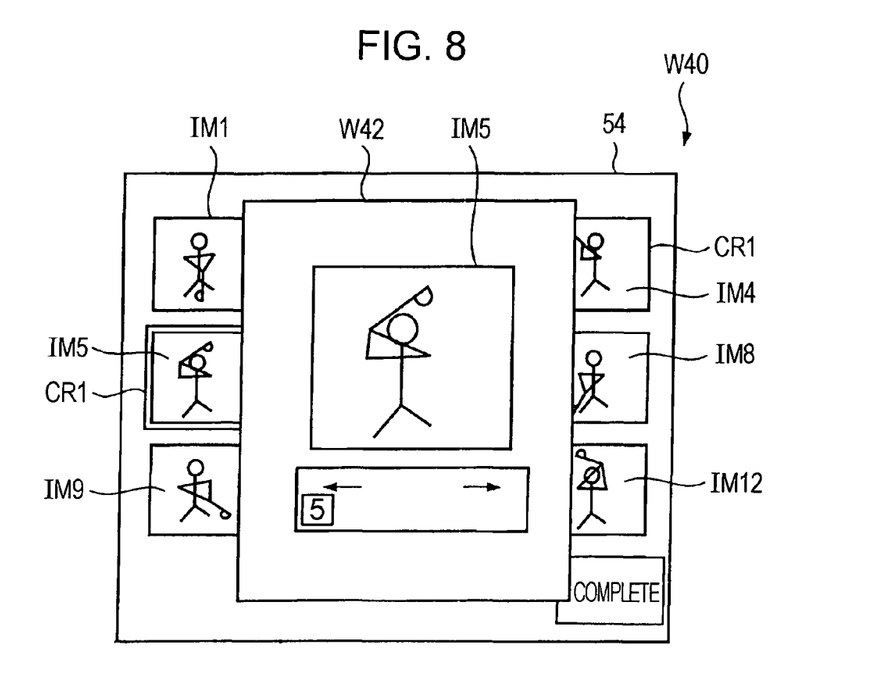
FIG. 8 is a diagram of an exemplary extracted image adjustment screen displayed on the display screen.

When it is determined that the user has issued an adjustment instruction ("YES" in step S26), that is, when the confirm button B12 has been pressed, the information processing apparatus 10 plays back the extracted image at which the cursor CR1 is positioned on a frame-by-frame basis (step S28). FIG. 8 shows an exemplary extracted image adjustment screen W40 displayed on the display screen 54 in this case.

As shown in FIG. 8, the extracted image adjustment screen W40 displays an extracted image adjustment window W42. On the extracted image adjustment window W42, the extracted image can be played back on a frame-by-frame basis in a forward or backward direction of the time flow. That is, assume that the user has selected the fifth extracted image IM5 as an image to be adjusted. The information processing apparatus 10 plays back, starting from the I picture of the extracted image IM5, B pictures and P pictures on a frame-by-frame basis. To move the playback image to the next video frame, the user presses the rightward button B24. To return to the previous video frame, the user presses the leftward button B22. In the case that the rightward button B24 or the leftward button B22 is pressed, the information processing apparatus 10 performs calculations necessary for generating a video frame from a B picture or a P picture and displays the generated video frame on the extracted image adjustment window W42.

Alternatively, every time the rightward button B24 or the leftward button B22 is pressed, instead of moving the video frames one at a time, frame-by-frame playback at a predetermined rate may be performed. For example, in the case that the rightward button B24 is pressed, frame-by-frame playback may begin in the forward direction of the time flow; in the case that the leftward button B22 is pressed, frame-by-frame playback may begin in the backward direction of the time flow.

According to the embodiment, the playback image is adjusted in the following manner. That is, the I picture of the selected, extracted image serves as the reference, and the playback image can be moved within the range from the video frame immediately following the I picture immediately preceding the I picture serving as the reference to the video frame immediately preceding the I picture immediately following the I picture serving as the reference. In the example shown in FIG. 8, the frame of the extracted image IM5 serves as a reference, and the playback from a frame that follows the extracted image IM4 to a frame that precedes the extracted image IM6 can be performed on a frame-by-frame basis on the extracted image adjustment window W42. This prevents the same extracted image from being printed multiple times or prevents the order (in terms of time) of the extracted images printed as a group from changing.

The user presses the confirm button B12 on the extracted image adjustment screen W40 at the time a desired video frame is displayed. Thus, the information processing apparatus 10 determines whether the user has pressed the confirm button B12 to determine whether the adjustment of the extracted image is completed (step S30). When it is determined that the adjustment of the extracted image is not completed ("NO" in step S30), processing from step S28 onward is repeated.

When it is determined that the adjustment of the extracted image is completed ("YES" in step S30), the flow returns to step S24 described above, and the extracted image display screen W30 is displayed again. This time, the adjusted extracted image is displayed on the extracted image display screen W30.

The extracted-image adjustment can be applied to any of the extracted images IM1 to IM12 selected by the user. A further adjustment can be applied to the already-adjusted, extracted image. To apply a further adjustment, the video frame can be moved forward or backward in terms of time around the extracted image selected at this point on the extracted image adjustment screen W40. Note that the range in which the user can move the video frame is, as has been described above, from the video frame immediately following the previous I picture to the video frame immediately preceding the next I picture in the time domain.

In contrast, when it is determined in step S26 that the user has issued no adjustment instruction ("NO" in step S26), the information processing apparatus 10 determines whether a video printing instruction is input (step S32). Specifically, in the case that the user determines to execute video printing on the extracted image display screen W30 shown in FIG. 7, the user moves the cursor CR1 to a complete button B30 and presses the confirm button B12. Thus, the information processing apparatus 10 determines whether the confirm button B12 is pressed.

When it is determined that no video printing instruction is input ("NO" in step S32), processing from step S26 onward is repeated.

In contrast, when it is determined that a video printing instruction is input ("YES" in step S32), video printing is executed (step S34). That is, print data is generated on the basis of the extracted images displayed at the time the user has issued the video printing instruction, and the print data is sent to the printer 80, thereby executing video printing.

Figure 9:
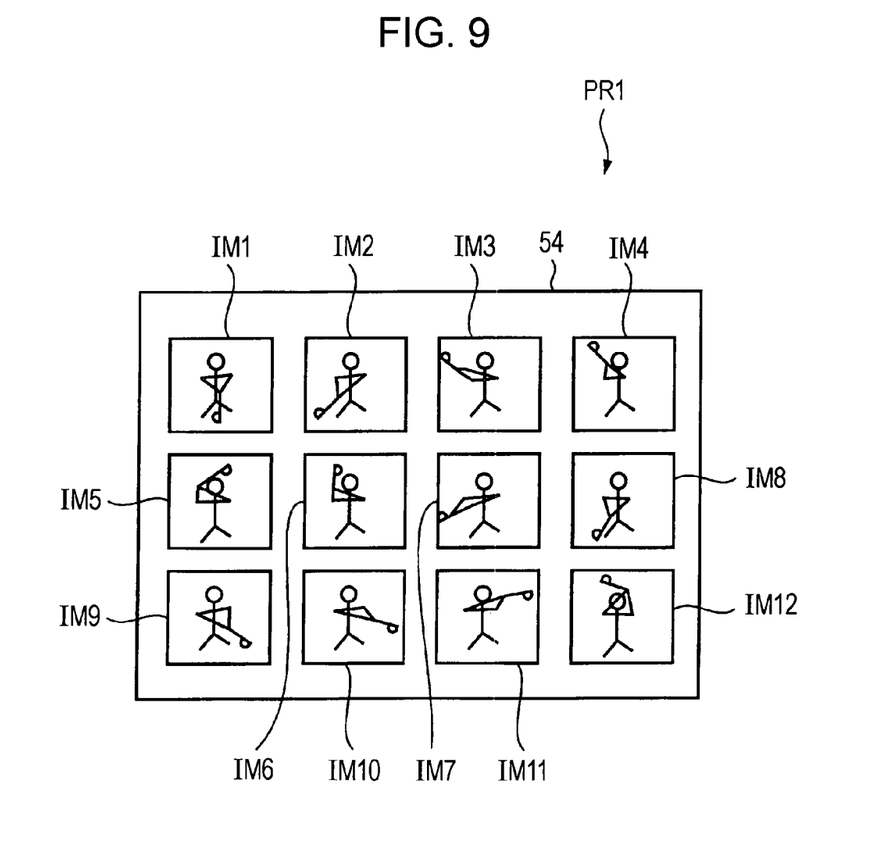
FIG. 9 is a diagram of an exemplary printout output from the information processing apparatus shown in FIG. 2.

FIG. 9 shows an exemplary printout PR1 obtained by the video printing executed in step S34. As is clear from the printout PR1, when video printing is executed, a plurality of images are extracted from the video stream and the extracted images are printed. These printed, extracted images are the same as the extracted images IM1 to IM12 displayed on the extracted image adjustment screen W40.

In the case of video printing, print data must be generated by appropriately enlarging/reducing the image data of the extracted images generated from I, P, and B pictures such that the extracted images are adjusted to the size of a print sheet serving as a print medium. By executing processing in step S34, the video printing process according to the embodiment ends.

As has been described above, according to the information processing apparatus 10 of the embodiment, a plurality of images can be extracted at predetermined time intervals starting from the first frame of a video file, and the extracted images can be printed as a group. Also, a plurality of images can be extracted at predetermined time intervals starting from a specified point of a video file, and the extracted images can be printed as a group. The user can therefore easily execute video printing of the images extracted from the video file.

Before video printing is actually executed, the extracted image display screen W30 is displayed so that the user can confirm images to be printed. This significantly improves the user-friendliness of the information processing apparatus 10.

When the extracted image display screen W30 is displayed in the beginning, the extracted images IM1 to IM12 are generated on the basis of I pictures each independently forming an image. Unlike the case where the extracted images are generated on the basis of B pictures or P pictures that need to take into consideration video frames that precede and/or follow the corresponding P or B pictures, the time required to generate the extracted images is significantly reduced. Therefore, the extracted image display screen W30 can be displayed within a short period of time, and the user's waiting time is reduced.

After the extracted image display screen W30 is displayed on the basis of the I pictures, the timing of extracting images from the video file may be adjusted as needed using the extracted image adjustment screen W40. This allows the user to execute video printing using the extracted images displayed at a desired timing.

The invention is not limited to the above embodiment, and various modifications can be made. For example, according to the above embodiment, a plurality of extracted images are generated on the basis of a reference frame and additional frames, which are video frames of consecutive I pictures that follow the reference frame. However, additional frames can be selected in any manner on the basis of the reference frame. For example, the extracted images may be generated on the basis of the reference frame and additional frames that are a predetermined number of consecutive I pictures that precede and follow the reference frame. Alternatively, the extracted images may be generated on the basis of the reference frame and additional frames that are a predetermined number of consecutive I pictures that precede the reference frame.

The extracted images on the printout PR1 can be of any number or layout, and the extracted images IM1 to IM12 on the extracted image adjustment screen W40 can be of any number or layout. That is, the layout is not limited to the above matrix consisting of three rows and four columns. The layout may be fixed or can be arbitrarily specified by the user.

The format of video files is not limited to MPEG-1. The invention is applicable to video files in various formats including MPEG-2, MPEG-4, and DivX. In other words, the invention is applicable to any information processing apparatus that displays or prints a group of extracted images on the basis of a video file at least including first image data based on which a video frame is generated and second image data based on which a video frame is generated by additionally referring to image data of another video frame.

The video printing process described in the above embodiment can be distributed in the form of a recording medium by recording a program for executing the video printing process on a recording medium, such as a flexible disk, a compact disc-read only memory (CD-ROM), a ROM, or a memory card. In this case, the program recorded on the recording medium is read and executed by the information processing apparatus 10, thereby implementing the above embodiment.

The information processing apparatus 10 may include additional programs, such as an operating system and other application programs. In such a case, the additional programs included in the information processing apparatus 10 can be utilized by recording, on a recording medium, a program including a command for invoking, from among the programs included in the information processing apparatus 10, a program for executing a process equivalent to the above embodiment.

The program may be distributed not in the form of a recording medium, but in the form of carrier waves via a network. The program transmitted in the form of carrier waves via a network is loaded into the information processing apparatus 10, and the information processing apparatus 10 executes the program to implement the above embodiment.

In the case that the program is recorded on a recording medium or transmitted via carrier waves over a network, the program may be encrypted or compressed. In such a case, the information processing apparatus 10 having read the program from the recording medium or carrier waves must decrypt or expand the program and execute the program.

The case in which the video printing process is executed by software is described in the above embodiment. Alternatively, the video printing process may be executed by hardware, such as an application specific integrated circuit (ASIC) or the like.

What is claimed is:

1. An information processing apparatus comprising:
   a timing specifying unit that allows a user to specify a timing to execute video printing of a video file at least including first image data based on which a video frame is generated without additionally referring to image data of another video frame and second image data based on which a video frame is generated by additionally referring to image data of another video frame;
   a reference frame selecting unit that selects, on the basis of the timing specified by the timing specifying unit, a video frame generated from the first image data as a reference frame;
   an additional frame selecting unit that selects, on the basis of the reference frame selected by the reference frame selecting unit, one or more additional video frames generated from the first image data as additional frames; and
   an extracted image displaying unit that generates a plurality of extracted images on the basis of the first image data of the reference frame and the first image data of the additional frames as generated extracted images, and displays a group of the generated extracted images on a screen.

2. The information processing apparatus according to claim 1, further comprising:
   a print data generating unit that generates, on the basis of the generated extracted images, print data for printing the group of the generated extracted images; and
   a print data sending unit that sends the print data generated by the print data generating unit to a printer.

3. The information processing apparatus according to claim 1, further comprising a first video playback unit that plays back a video stream by generating successive video frames on the basis of the first image data and the second image data.

4. The information processing apparatus according to claim 3, wherein the timing specifying unit allows the user to specify the timing to execute video printing during playback of the video stream by the first video playback unit.

5. The information processing apparatus according to claim 3, wherein, in a case that the user specifies the timing to execute video printing during playback of the video stream by the first video playback unit, the reference frame selecting unit selects, as the reference frame, a video frame of the first image data that is closest to a video frame being played back at the timing specified by the user.

6. The information processing apparatus according to claim 5, wherein the additional frame selecting unit selects, as the additional frames, video frames of a predetermined number of pieces of the first image data that follow the reference frame, video frames of a predetermined number of pieces of the first image data that precede the reference frame, or video frames of a predetermined number of pieces of the first image data that precede and follow the reference frame.

7. The information processing apparatus according to claim 1, further comprising a video file specifying unit that allows the user to specify a video file and to give a video printing instruction,
wherein, in a case that the video printing instruction is issued by the video file specifying unit, the reference frame selecting unit selects the first image data at the beginning of the specified video file as the reference frame.

8. The information processing apparatus according to claim 1, further comprising:
an extracted image selecting unit that selects one extracted image from among the group of the generated extracted images displayed by the extracted image displaying unit;
a second video playback unit that plays back, starting from the video frame of the extracted image selected by the extracted image selecting unit, video frames of the second image data in a forward or backward direction on a frame-by-frame basis; and
a replacement unit that replaces the extracted image selected by the extracted image selecting unit with a video frame being played back by the second video playback unit at a timing specified by the user.

9. The information processing apparatus according to claim 8, wherein the video frames played back by the second video playback unit are video frames from the video frame of the second image data immediately following the video frame of the first image data immediately preceding the video frame of the extracted image selected by the extracted image selecting unit to the video frame of the second image data immediately preceding the video frame of the first image data immediately following the video frame of the extracted image selected by the extracted image selecting unit.

10. A control method for an information processing apparatus, the method comprising:
allowing a user to specify a timing to execute video printing of a video file at least including first image data based on which a video frame is generated without additionally referring to image data of another video frame and second image data based on which a video frame is generated by additionally referring to image data of another video frame;
selecting, on the basis of the specified timing, a video frame generated from the first image data as a selected reference frame;
selecting, on the basis of the selected reference frame, one or more additional video frames generated from the first image data as additional frames; and
generating a plurality of extracted images on the basis of the first image data of the reference frame and the first image data of the additional frames as generated extracted images, and displaying a group of the generated extracted images on a screen.

11. A non-transitory computer-readable recording medium having a program recorded thereon, the program allowing an information processing apparatus to execute:
allowing a user to specify a timing to execute video printing of a video file at least including first image data based on which a video frame is generated without additionally referring to image data of another video frame and second image data based on which a video frame is generated by additionally referring to image data of another video frame;
selecting, on the basis of the specified timing, a video frame generated from the first image data as a selected reference frame;
selecting, on the basis of the selected reference frame, one or more additional video frames generated from the first image data as additional frames; and
generating a plurality of extracted images on the basis of the first image data of the reference frame and the first image data of the additional frames as generated extracted images, and displaying a group of the generated extracted images on a screen.

* * * * *